Figure 1:
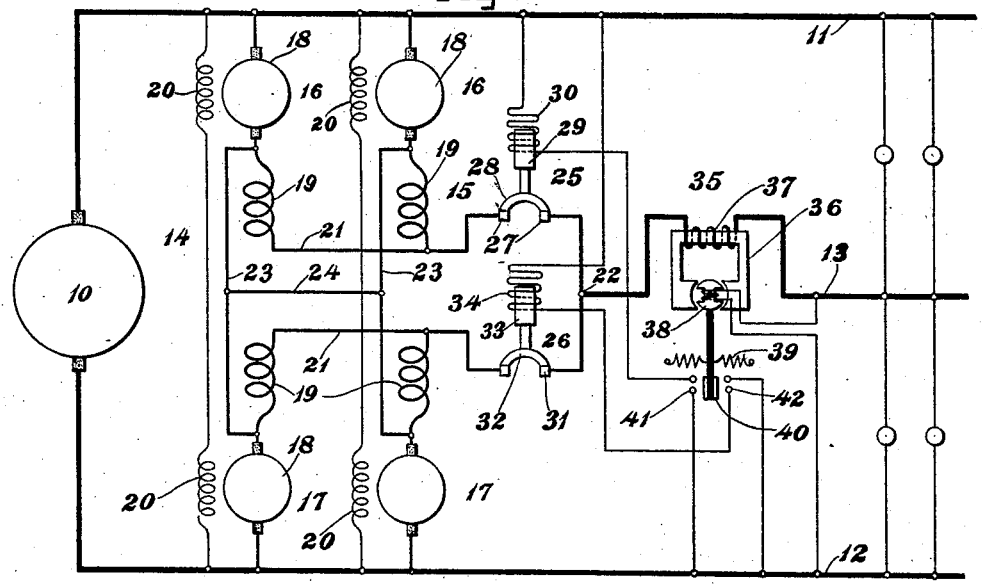

No. 850,278. PATENTED APR. 16, 1907.
L. L. TATUM.
SYSTEM OF DISTRIBUTION.
APPLICATION FILED MAR. 31, 1906.

WITNESSES
Oliver W. Sharman
Fred J. Kinsey

INVENTOR
Lewis L. Tatum
By
Chas. E. Lord
ATTORNEY

UNITED STATES PATENT OFFICE.

LEWIS L. TATUM, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

SYSTEM OF DISTRIBUTION.

No. 850,278.     Specification of Letters Patent.     Patented April 16, 1907.

Application filed March 31, 1906. Serial No. 309,019.

*To all whom it may concern:*

Be it known that I, LEWIS L. TATUM, a citizen of the United States, residing at Norwood, in the county of Hamilton and State of Ohio, have invented certain new and useful Improvements in Systems of Distribution, of which the following is a full, clear, and exact specification.

My invention relates to multiple-voltage systems of distribution having any number of feeder conductors and circuits, and particularly to three-wire systems in which the voltages between the main conductors and the compensating conductor are equal, called the "symmetrical" three-wire systems, or in which the voltages are unequal, called the "unsymmetrical" three-wire systems.

It is customary to employ in a multiple-voltage system a balancer, consisting of two or more dynamo-electric machines connected across the main conductors or legs of the system and to the neutral or compensating conductor or conductors. As is well known, when the current-loads on the circuits or branches of the system are equal or balanced the dynamo-electric machines run as motors without load and with slight losses. When the loads are unequal, current flows through one or more compensating conductors and one or more of the machines are driven as generators to supply power to the heavier-loaded branch or branches to maintain the voltages at substantially their proper values.

On account of the inherent regulating qualities of compound-wound machines it is desirable to employ compound-wound dynamo-electric machines in the balancer set in order that the generator of the balancer set may supply current at increased voltage as the load on the heavier-loaded branch of the system increases. Since the current through the armature and series field-winding of one of the machines of a balancer when acting as a generator is opposite in direction to that when acting as a motor and since the series and shunt fields of a machine must be cumulative when the machine acts as a generator it follows that the fields are differential when the same machine acts as a motor. In other words, the machines acting as generators have cumulative fields and the machines acting as motors have differential fields and the degree of differential action depends on the value of the current in the compensating conductor, and hence on the difference in the loads on the two sides of the system.

It is well known that a motor having differentially-wound fields may race or run away on current-overload. Heretofore on account of the differential action of the fields of the motor compound-wound balancers have been unsuccessful when the difference in the loads is considerable, due to their unstable action and the danger of the machines of the balancer "running away." When the loads are equal and both machines are running as motors, the field of each machine is due chiefly to the current in its shunt-winding. Now as the loads become unequal the field of the motor due to the current in the shunt-winding is opposed by the field due to the current in the series winding, which is now greater than when the loads were equal. The result is that the speed of the motor is increased, increasing the voltage of the generator to which it is connected. If the difference in the loads on the two sides of the system becomes greater, the differential field action of the motor increases and its speed becomes correspondingly greater. The result is that the current fed to the lamps or other translating devices on the heavier-loaded side becomes so great that said translating devices may be destroyed or the balancer may be destroyed on account of its speed.

It has been proposed to employ compound-wound dynamo-electric machines in balancers and to avoid the differential field action of the motor, and hence the danger of the machine running away, by short-circuiting the series winding of either machine when it becomes a motor. While this method is satisfactory in most respects, it has been found that on account of the low resistance of the series windings and the rather high contact resistance of the short-circuiting switches that it is a difficult matter to short-circuit or to divert from the motor series winding a sufficient percentage of current to avoid the differential field action. Furthermore, with this method it is necessary to employ short-circuiting apparatus which are sufficiently sensitive to operate on a very slight unbalanced load.

One of the objects of my invention is to provide means whereby compound-wound dynamo-electric machines can be employed in balancers for multiple-voltage systems with less danger of the balancers racing on unbalanced loads.

A further object is to provide means whereby the series winding of the machine acting as a motor when the loads are unbalanced can be cut out of service at any predetermined degree of unbalancing, so that the motor acts first as a differential motor and is then changed to a shunt-motor when the unbalancing reaches a predetermined amount without causing a sudden change of voltage, whereby the necessity for the use of apparatus sensitive to a slight unbalanced load is avoided.

A still further object is to improve in general the operation of compound-wound balancers in multiple-voltage systems.

In carrying out my invention I provide a balancer which consists of compound-wound dynamo-electric machines connected to the conductors of the distributing system and provide means for automatically opening the circuit of the series winding of the machine acting as a motor.

More specifically considered, my invention consists in a multiple-voltage system of distribution having one or more balancers consisting of compond-wound dynamo-electric machines and means comprising one or more switches and a reverse-current relay for open-circuiting the series field-windings of the machine or machines acting as motors when the unbalanced load reaches a predetermined amount. The field-windings of the balancers are so arranged and connected that after the series windings of the motors are opened the motor-armature currents, as well as the generator-armature currents, pass through the series field-windings of the generators. By the differential field action of the motors of the balancers the speed of the balancers and the generated voltage are slightly increased, the increase in voltage being about sufficient to compensate for the increase of the internal voltage drop of the machines, and when the series windings are open-circuited and the motors are changed from differential to shunt motors the speed of the balancers is slightly decreased; but at the same time the currents in the series windings of the generators of the balancers, and hence the magnetic fields of the generators, are increased to such an extent as to prevent a decrease in the generated voltage due to a decrease of speed.

My invention still further consists in certain novel combinations and arrangements of parts described in the specification, and set forth in the appended claims.

For a better understanding of my invention reference is had to the accompanying drawings, in which—

Figure 2:
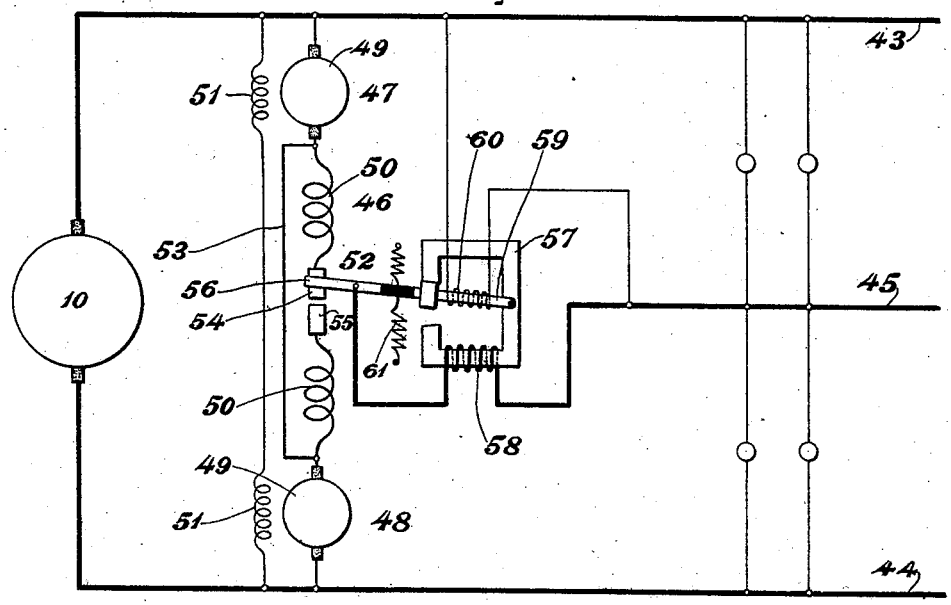

Figure 1 shows a multiple-voltage system of distribution in which compound-wound balancers equipped with my invention are employed; and Fig. 2 shows a system of distribution and a compound-wound balancer, a slightly different apparatus being employed.

Referring now to the figures of the drawings, 10 represents the main source of current—in this case a generator—for supplying current to the multiple-voltage system of distribution, consisting in this case of two main conductors 11 and 12 and a neutral or compensating conductor 13. It may be stated at this point that my invention has equal application to systems in which the voltages between the sets of conductors are equal and to those in which the voltages are unequal, or, in other words, to the symmetrical and the unsymmetrical voltage systems.

My invention may also be applied to a system in which there are more than three conductors.

In Fig. 1 two balancers are shown at 14 and 15, adapted to operate in parallel to maintain the voltages of the conductors of the system at their predetermined values. Each balancer consists of two compound-wound dynamo-electric machines 16 and 17, each of which machines consist of an armature 18, series winding 19, and shunt-winding 20. The armatures of machines 16 are directly connected to conductor 11 and the armatures of machines 17 are directly connected to conductor 12. Series windings 19 of each balancer are between the armatures and are connected together in this case by a conductor 21, to which the neutral or compensating conductor 13 is connected at 22. A low-resistance conductor 23 connects the two machines 16 and 17 of each balancer. In this case the conductors 23 are connected to the machines at the points between the armatures and series field-coils. These two conductors 23 are joined together by an equalizing-conductor 24. Located in the conductor 21 on both sides of the point 22, and hence on both sides of the neutral or compensating conductor 13, are two solenoid open-circuiting switches 25 and 26. As will appear later, the purpose of switch 25 is to cut out of service by open-circuiting the series field-windings of the machines 16 of the balancers when the load between conductors 13 and 12 becomes a predetermined amount greater than the load between conductors 11 and 13, and the function of switch 26 is to cut out of service by open-circuiting the series field-windings of the machines 17 of the balancers when the load between the conductors 11 and 13 becomes a predetermined amount greater than the load between conductors 13 and 12.

Switch 25 consists of stationary contacts 27 and a bridging contact 28, mounted on the core or plunger 29 of the solenoid having a coil 30. Switch 26 consists of stationary contacts 31 and a bridging contact 32, mounted upon the core or plunger 33 of the solenoid having a coil 34. In this case I control the solenoid-switches by a reverse-current relay 35. The relay consists of a core 36, having a series winding 37, which is included in the neutral or compensating conductor 13, and a pivoted member carrying potential-coil 38, permanently connected across two conductors of the system, here shown as connected across conductors 13 and 12. The movable element of the relay is held in its mid-position by springs 39 when the loads between the conductors are balanced, the springs being preferably so adjusted that the relay will not be actuated until the unbalanced load reaches a predetermined amount.

The movable element of the relay carries a contact member 40, adapted to engage when in one extreme position stationary contacts 41 and when in the opposite extreme position stationary contacts 42. As shown in the drawings, the upper contact of group 41 is connected to solenoid-coil 30 of switch 25 and to conductor 11, and the lower contact of the group is connected to conductor 12. It is seen, therefore, that when the contacts 41 are bridged by the contact member 40 of the movable member of the reverse-current relay coil 30 of switch 25 is energized and the full voltage of the system is impressed upon the coil, which causes a movement of the bridging member 28 away from the stationary contacts 27 and causes the series windings 19 of machines 16 to be open-circuited. When the movable element of the reverse-current relay is actuated in the opposite direction, the group of contacts 42 is bridged by contact member 40 and the full voltage of the system is impressed upon solenoid-coil 34 of switch 26, causing switch 26 to be opened and series coils of machines 17 to be open-circuited. It is seen that before contact member 40 bridges the group 42 it leaves group 41, and hence at least one of the solenoid-switches is always closed.

The function and operation of the apparatus will now be more fully explained. When the loads are balanced, the machines of each balancer run as motors without load and with slight losses. Since the series field-windings are shunted by the low-resistance conductors 23, little current passes through the series windings and the machines operate as shunt-motors. When the loads between the conductors are equal, no current passes through the compensating conductor 13 to or from the balancers, and hence no current passes through the coil 37 of the reverse-current relay. The movable member of this relay is therefore held in its mid-position by the springs 39. If now the loads between the conductors become unequal, current flows through the compensating conductors 13 in one direction or the other and the core of the relay is magnetized. Assume that the load between conductors 11 and 13 is greater than the load between conductors 13 and 12. Machines 16 now act as generators and machines 17 act as motors to supply power to the more heavily loaded side 11 and 13 to maintain the voltages at their predetermined values. Current now flows along the compensating conductor 13, and the coils of the relay are so wound that the torque between the parts of the relay tend to move the contact member 40 toward the group of contacts 42. The springs 39 are so adjusted that they hold contact member 40 out of engagement with contacts 42 until there is a certain predetermined unbalancing of the loads—for example, until the unbalanced load becomes twenty-five per cent. to fifty per cent. of the greatest unbalanced load for which the apparatus is designed. Until this point of unbalancing is reached current flows along the compensating conductor to point 22, where it divides, passing through both closed solenoid-switches 25 and 26 and through both branches of the conductor 21, through the series field-windings of the motor and generator of each balancer. Field-windings 19 and 20 of the generators 16 are now cumulative, and the field-windings 19 and 20 of the motors 17 are now differential. The machines and the apparatus are so designed, however, that the differential action is slight and there is no danger of racing. However, if this differential action should continue until the unbalanced load becomes excessive the balancers might race and the translating devices, such as lamps or motors, might be destroyed and the machines of the balancers wrecked. When the unbalanced load reaches a predetermined amount, the holding force of the springs 39 is overcome by the torque of the relay, contact member 40 is moved into engagement with contacts 42, the circuit is completed from conductor 11 to conductor 12 through coil 34 of the solenoid-switch 26, and the switch is opened. By the opening of this switch the series field-windings 19 of the motors 17 are open-circuited, and hence totally cut out of service. The current necessary to drive the motors 17 now all passes through the upper branch of conductor 21, through the series field-windings of machines 16 of the balancers, and back through conductors 23 to the armatures of motors 17. It is seen that by opening switch 26 the motors are converted from differential to shunt motors. By this operation the fields of the motors are increased and at the same time the fields of the generators are increased. The machines are so designed that the slight increase of speed of the balancers due to the motor differential field action causes a slight increase of voltage, which is just sufficient to compensate for the increased internal drop in the machines due to the increase of load on the machines. When the switch 26 is opened and the series field-windings are open-circuited, the fields of the motors are suddenly increased, causing a decrease in the speed of the balancers. At the same time, however, the fields of the generators are increased, since the motor-current, as well as the generator-current, now passes through the series field-windings of the generators, increasing the generator fields, preventing a drop in voltage due to the decrease of the speed of the balancers.

When the load between conductors 13 and 12 is greater than the load between conductors 11 and 13, machines 16 act as motors to drive machines 17 as generators to supply power to the more heavily loaded conductors 13 and 12. Current now flows through the compensating conductor 13 in the opposite direction to that when the load between conductors 11 and 13 is greater than the load between conductors 13 and 12. When this current reaches a predetermined amount, contact member 40 bridges contacts 41, completing the circuit through the solenoid-coil 30 of switch 25, cutting out of service the series field-windings 19 of machines 16 in the same manner and with the same result previously described.

It is seen that when the current in conductor 13 becomes sufficient to operate the relay and after the circuits of the series windings of the motors are opened differential field actions are entirely avoided. The apparatus can be adjusted to operate at any predetermined unbalanced load, it being unnecessary to cut out of service the series field-windings of the motors when the loads are slightly unbalanced, for the reason that the danger of racing is slight and for the further reason that the motors can be changed from differential to shunt motors at any predetermined unbalanced load without causing a sudden change in voltage.

When two or more balancers, each consisting of two compound-wound dynamo-electric machines, are connected and operated in parallel on the same system, as is shown in Fig. 1, the danger to the lamps and to the machines themselves, due to the differential field action of the motors when the loads are excessively unbalanced, is greater than when a single balancer is employed. This is probably due to the fact that the generator of one of the balancers may, in case of an increase of speed of that balancer over the other, supply current to the generator of the latter balancer, changing it to a motor and increasing the speed of that balancer. Thus the operation would be very unstable, the function as balancers would be less, and the danger to the lamps and machines would be greater than if a single balancer were connected to the system. If the series fields of the motors are open-circuited at a certain predetermined unbalancing of the loads, there is much less danger of the speed of one balancer becoming greater than the speed of the other balancer. My invention therefore has a special utility when applied to balancers operated in parallel.

In Fig. 2 I have shown a simplified form of an open-circuiting apparatus. The conductors of the multiple-voltage-distributing system are shown at 43, 44, and 45. At 46 is shown a single balancer, which, as in the preceding case, consists of two compound-wound machines 47 and 48, each having an armature 49, series field-winding 50, and shunt field-winding 51. The armatures are directly connected to conductors 43 and 44, respectively, and the series windings are directly connected together through a switch 52, the switch being located between the two windings. As in the preceding case, a low-resistance conductor 53 connects a point between the series field-winding and the armature of one machine to a point between the series field-winding and armature of the other machine. The shunt-windings of the two machines are connected across the conductors 43 and 44. A single switch 52 is employed in this case for cutting out of service either series winding, which switch is operated directly by a reverse-current relay. The switch 52 consists of two contact members 54 and 55, connected, respectively, to the two series windings, and a bridging member 56. This movable contact member 56 is adapted to be operated directly by the movable member of the reverse-current relay. The relay consists of a core 57, having one or more series coils 58 included in the compensating conductor 45, and a movable member 59, carrying a potential coil 60, connected across the conductors 43 and 45. The movable member 56 of the open-circuiting switch 52 is preferably connected directly to the movable member of the relay and, as shown, is insulated therefrom. As in the preceding case, springs 61 tend to hold the movable member of the relay in its central or mid position. When the loads are balanced and no current is passing along the conductor 45, the core is demagnetized and the movable member of the relay is held in its central or mid position with the bridging contact 56 of the switch in engagement with both stationary contacts 54 and 55, to which the series coils are connected. If the load between conductors 43 and 45 becomes greater than the load between conductors 45 and 44, current passes along the conductor 45 and machine 48 acts as a motor to drive machine 47 as a generator. When the loads are only slightly unbalanced, the movable member of the switch still remains in its central position, and current passes through the series field-windings 50 of both machines, machine 48 acting as a differential motor. When the unbalanced load reaches a certain amount, determined by the stiffness of the springs 61, the pull between the parts of the relay becomes great enough to overcome the resistance of the spring, and the bridging contact 56 of the switch is moved away from the contact 55, so that the connection between the series field-winding 50 of the motor 48 and the compensating conductor 45 is broken. All the current flowing in the compensating conductor now passes through the series field-winding 50 of the generator 47, and the motor-armature current passes through conductor 53 to the armature of the motor 48. The motor is now excited solely by the shunt-winding, and generator 47 remains a compound generator having cumulative fields.

When the loads again become balanced or the unbalancing falls below the predetermined limit as determined by the tension of the spring, the movable member of the switch is again moved to its central or normal position.

In case the load between conductors 45 and 44 becomes greater than the load between conductors 43 and 45 and the unbalanced load reaches the predetermined amount the switch member is moved away from contact 54 and machine 47 is changed to a shunt-motor, with the same result previously described.

I have shown a reverse-current relay for operating the open-circuiting switches; but other means can be employed, if desired, for this purpose. If a reverse-current relay is employed, it is not necessary that it be provided with a coil in the compensating conductor, as the desired effect can be accomplished in many different ways.

I do not desire to be limited to the exact details shown, as many changes can be made without departing from the spirit and scope of my invention.

What I desire to secure by Letters Patent is—

1. In a multiple-voltage system of distribution, a balancer comprising compound-wound dynamo-electric machines connected to the conductors of the system, and means for automatically open-circuiting the series field-winding of one of said machines when the loads become unbalanced.

2. In a multiple-voltage system of distribution, a balancer comprising a plurality of compound-wound dynamo-electric machines connected to conductors of the system, and means responsive to an unbalancing of the loads for automatically opening the circuit of the series field-winding of any one of said machines.

3. In a multiple-voltage system of distribution, a balancer comprising a plurality of dynamo-electric machines each having series and shunt field-windings, and means responsive to a predetermined flow of current in one of the conductors of the system for open-circuiting the series winding of any one of said machines.

4. In a multiple-voltage system of distribution, main and compensating conductors, a balancer comprising a plurality of dynamo-electric machines each having series and shunt field-windings, and electromagnetically-operated means responsive to a predetermined unbalancing of the loads for open-circuiting the series winding of any one of said machines.

5. In a multiple-voltage system of distribution, main and compensating conductors, one or more balancers comprising a plurality of compound-wound dynamo-electric machines connected to said conductors, one or more normally closed switches in circuit with the series windings, and automatically-operated means for controlling said switch or switches.

6. In a multiple-voltage system of distribution, a balancer comprising compound-wound dynamo-electric machines, and means comprising a switch for opening the circuit of one of the field-windings of one of said machines when the loads become unbalanced.

7. In a multiple-voltage system of distribution, a plurality of conductors, a balancer comprising a plurality of compound-wound dynamo-electric machines, and means comprising one or more automatically-operated switches for opening the circuit of either one of the series field-windings when the loads become unbalanced.

8. In a multiple-voltage system of distribution, a plurality of conductors, a balancer comprising a plurality of compound-wound dynamo-electric machines, and means comprising a switch and a reverse-current relay for opening the circuit of either one of the series field-windings upon a predetermined unbalancing of the loads.

9. In a multiple-voltage system of distribution, a plurality of main and compensating conductors, a balancer comprising a plurality of compound-wound dynamo-electric machines, and means comprising a plurality of switches and a reverse-current relay having a coil in a compensating conductor for open-circuiting the series coils of the machines acting as motors when the loads are unbalanced.

10. In a multiple-voltage system of distribution, a plurality of conductors, a plurality of balancers connected in parallel to the conductors of said system, each balancer consisting of compound-wound dynamo-electric machines, and means for open-circuiting the series winding of those machines acting as motors when the loads are unbalanced.

11. In a multiple-voltage system of distribution, a plurality of conductors, a plurality of balancers connected in parallel to the conductors of the system, each balancer consisting of two compound-wound dynamo-electric machines, and automatic means responsive to a predetermined unbalancing of the loads for open-circuiting the series windings of the machines acting as motors.

12. In a multiple-voltage system of distribution, a balancer comprising compound-wound dynamo-electric machines connected to the conductors of the system, and means for open-circuiting the series winding of one of said machines when the loads become unbalanced without opening the armature-circuit of that machine.

13. In a multiple-voltage system of distribution, a balancer comprising compound-wound dynamo-electric machines connected to the conductors of the system, and means responsive to a predetermined unbalancing of the loads for opening the circuit of the series winding of the machine acting as a motor, and means for completing the motor-armature circuit when the series winding is open-circuited.

14. In a multiple-voltage system of distribution, a plurality of conductors, a balancer comprising two compound-wound dynamo-electric machines, and automatic means for open-circuiting the series winding of the machine acting as a motor when the loads are unbalanced, and means comprising an auxiliary conductor for completing the motor-armature circuit when its series winding is open-circuited.

15. In a multiple-voltage system of distribution, a plurality of conductors, one or more balancers connected across the legs of the system, each balancer consisting of a plurality of compound-wound dynamo-electric machines, automatically-operating means for opening the circuit of the series winding or windings of the machine or machines acting as motors when the loads are unbalanced, and means comprising one or more auxiliary conductors for completing the motor-circuit of each balancer when its series winding is open-circuited.

16. In a multiple-voltage system of distribution, a plurality of conductors, a balancer comprising two compound-wound dynamo-electric machines having their armatures connected to the legs of the system and the series windings being connected together and to a compensating conductor between said armatures, a low-resistance conductor shunting the series windings and means for disconnecting the series winding of either machine from the compensating conductor on a predetermined unbalancing of the loads.

17. In a multiple-voltage system of distribution, a plurality of conductors, a balancer comprising two compound-wound dynamo-electric machines having their armatures connected to the legs of the system and the series windings connected directly to each other and to a compensating conductor between the armatures, a conductor connecting a point between the armature and series field-winding of one machine to a point between the armature and series field-winding of the other machine, and means comprising one or more switches for automatically disconnecting the series field-winding of either machine from the compensating conductor.

18. In a multiple-voltage system of distribution, a plurality of main and compensating conductors, a plurality of balancers connected to said conductors in parallel, each balancer consisting of two compound-wound dynamo-electric machines having their armatures connected to the main conductors respectively, and their series windings normally connected together and to the compensating conductor, means comprising a switch between the compensating conductor and the series windings on each side of said compensating conductor for disconnecting the compensating conductor from the series windings of those machines acting as motors on a predetermined unbalancing of the loads, and an auxiliary conductor connected to points between the armatures and series windings of each balancer for conveying the motor-armature current from or to the compensating conductor when the series windings thereof are disconnected from the compensating conductor.

In testimony whereof I affix my signature in the presence of two witnesses.

LEWIS L. TATUM.

Witnesses:
ARTHUR F. KEVIS,
FRED J. KINSEY.